United States Patent [19]

Fukaya et al.

[11] Patent Number: 4,748,524

[45] Date of Patent: May 31, 1988

[54] ALIGNMENT DISK FOR USE IN ADJUSTING OR INSPECTING A MAGNETIC HEAD IN A FLOPPY DISK DRIVE UNIT

[75] Inventors: Noburo Fukaya; Katsuhide Tanoshima, both of Tokyo; Masatoshi Hisada, Yokohama, all of Japan

[73] Assignees: Oki Electric Industry Co., Ltd., Tokyo; Tokyo Engineering Co., Ltd., Yokohama, both of Japan

[21] Appl. No.: 945,544

[22] Filed: Dec. 23, 1986

[30] Foreign Application Priority Data

Dec. 24, 1985 [JP] Japan .................................. 60-289437

[51] Int. Cl.$^4$ .............................................. G11B 5/56
[52] U.S. Cl. .................................... 360/109; 360/135; 360/77
[58] Field of Search .......................... 360/109, 135, 77

[56] References Cited

U.S. PATENT DOCUMENTS 4,542,428 9/1985 Yanagi ............................. 360/77 X

FOREIGN PATENT DOCUMENTS 60-18814 1/1985 Japan ................................. 360/109
61-45409 3/1986 Japan ................................. 360/109

Primary Examiner—John H. Wolff
Attorney, Agent, or Firm—Spencer & Frank

[57] ABSTRACT

In an alignment disk for use in adjustment or inspection of a magnetic read/write head in a floppy disk drive unit, which further includes an erase head, the alignment disk is provided with first regions in which signals are prerecorded and second regions in which no signals are prerecorded, the first and the second regions being alternately disposed along a locus followed by the read/write head when the disk is rotated. The length of each of the first region is smaller than the distance between read/write head and the erase head and the length of each of the second regions are larger than the distance between the read/write head and the erase head.

5 Claims, 4 Drawing Sheets

ALIGNMENT DISK FOR USE IN ADJUSTING OR INSPECTING A MAGNETIC HEAD IN A FLOPPY DISK DRIVE UNIT

BACKGROUND OF THE INVENTION

The present invention relates to an alignment disk for use in adjustment of the position of or inspection of a magnetic head of a floppy disk drive unit.

A floppy disk drive unit has two magnetic head assemblies on opposite sides of the disk for writing data in and reading data from the respective sides of the floppy disk.

Data is recorded along tracks extending circumferentially. The intervals between adjacent tracks are designed to be smaller and smaller to meet the demand for higher data storage capacity.

As an example, a typical track-to-track interval was 529 micrometers, whereas a narrower interval of 265 micrometers is now more often employed. The future trend is toward even narrower intervals. Accordingly, higher precision is required for the adjustment of the ralative position between the two magnetic head assemblies, and for the positioning of the two assemblies relative to the frame of the disk drive.

Use of an alignment disk for the adjustment is often adopted. A problem associated with the use of an alignment disk is a waveform interference due to magnetic coupling between an erase head and a read/write head.

To solve the problem, Japanese Patent Application Publication No. 39443/1982 proposes that a certain frequency should be used for the signal recorded on the alignment disk. When this teaching is followed in connection with a 5-inch floppy disk with inter-track distance of 529 micrometers, a suitable range of the frequency f is given as follows: With the distance from the axis of rotation of the disk to the position of the head: r 32 46563 micrometer, with the rotational speed of the disk: n=5 (rps), with the minimum (within the tolerance) inter-head (gap) distance: $L_{RE(MIN)}$=800 micrometers, with the maximum (within the tolerance) interhead (gap) distance: $L_{RE(MAX)}$=900 micrometers, and with the minimum inter-magnetic-transition distance:a=10 micrometers, the following relationship must be satisfied.

$$925.84\ m < f < 803.74\ (m+1),$$

where m is 0 or a positive integer. The above relationship is satisfied if $m \leq 6$. The maximum frequency is therefore $$803.74 \times (6+1) = 5626\ HZ.$$

This value is substantially lower compared with the frequency 125 kHz, which is the frequency of the signals used in the conventional alignment disk. With such a low frequency, the waveform of the signals which appear on an oscilloscope is faint and is difficult to observe.

If the brightness is increased by increasing the gain of the oscilloscope, the base line becomes too bright and is tiring to the obserbing person's eyes. These problems are particularly serious where the oscilloscope is used in a mass production line, for the adjustment or inspection of mass-produced floppy disk drive units.

SUMMARY OF THE INVENTION

An object of the invention is to eliminate the above described problems.

Another object is to provide an alignment disk which permits easier observaton of the waveform of the signals on an oscilloscope.

According to the invention, there is provided an alignment disk for use in adjustment or inspection of a magnetic read/write head in a floppy disk drive unit, which further includes an erase head, said alignment disk being provided with first regions in which signals are prerecorded and second regions in which no signals are prerecorded, the first and the second regions being alternately disposed along a locus followed by the read/write head when the disk is rotated, wherein the length of each of the first region is smaller than the distance between read/write head and the erase head and the length of each of the second regions are larger than the distance between the read/write head and the erase head.

With the alignment disk defined above, the signals rear by the read/write head through the erase head due to magnetic coupling between the read/write head and the erase head appear only when one of the second regions is passing the read/write head. As a result, the frequency of the signals recorded in the alignment disk need not be low. The waveform on the oscilloscope is therefore bright, so that the observation is facilitated.

DETAILED DESCRIPTION OF THE PREFERRED EMBODIMENTS

The invention is applicable to various types of alignment disks. Application of the invention to two types of alignment disk, namely the cat's eye type and the burst type will be described.

Figure 1:
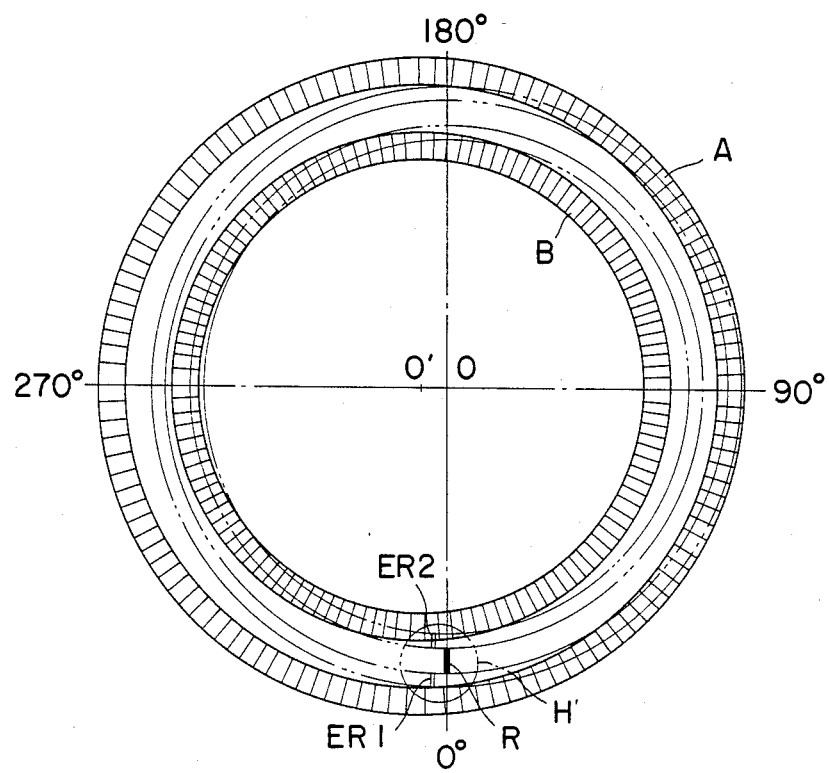
FIG. 1 is a schematic diagram showing general configuration of an alignment disk of a cat's eye type relating to a first embodiment of the invention.

First, principle of measurement or error detection by use of an alignment disk of the cat's eye type will be described with reference to FIG. 1. As illustrated, an alignment disk has two data tracks A and B on the respective sides of the disk, with a center 0' a little deviating from an axis of 0 of rotation of the disk. The data recorded along the tracks A and B is for example an AC signal of a fixed frequency, e.g., 125 KHz. Typically, these two tracks have diameters intermediate between the diameters of the innermost and the outermost tracks of an ordinary disk used in the floppy disk drive unit, so that the adjustment or inspection of the head position is conducted at a position in the middle of the operation range in the radial direction.

Figure 2:
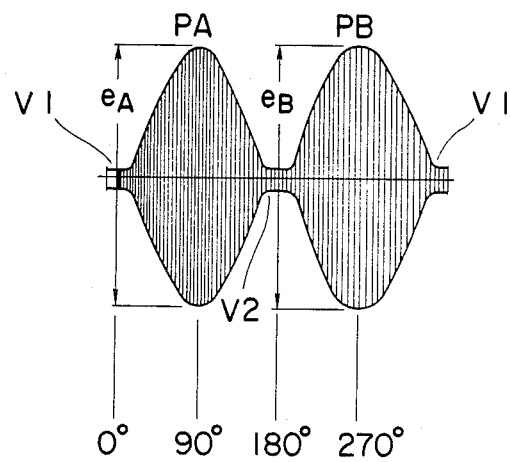
FIG. 2 is a waveform diagram showing a signal produced when the alignment disk is rotated.

When such an alignment disk is mounted on a disk drive unit, the signal as picked up by the read/write head H will have a waveform as shown in FIG. 2. This waveform can be displayed on an osilloscope connected at an output of an amplifier of the disk drive unit for amplifying the output of the head. As illustrated, the waveform has a high frequency (125 KHz) component with an envelope corresponding to the relative position of the head and the data tracks which varies as the disk is rotated.

The peaks of the envelope appear at PA and PB. The peak PA corresponds to the position (90° in FIG. 1) where the track A is directly confronting the head H. The peak PB corresponds to the position (270° in FIG. 1) where the track B is directly confronting the head H. The valleys V1 and V2 correspond to the positions (0° and 180° in FIG. 1) where the head is between the two tracks.

The magnitudes $e_A$ and $e_B$ of the peaks PA and PB of the envelope are affected by the error of the position of the head from the expected position. More particularly, the ratio between $e_A$ and $e_B$ can be used as an indication of the error of the position of the head and can be used to correct or adjust the position of the head. This is the socalled cat's eye method of measurement.

The measurement however has an error due to magnetic coupling between the read/write head and the erase head. Although the erase head is for erasing only, it also picks up magnetic flux from the confronting track and transmits it to the read/write head. Such transmission of the magnetic flux or the data is the cause of the error.

According to the invention, this problem has been solved by the alternate disposition along the data track of first or signal regions in which signals are recorded and second or no-signal regions in which no signals are recorded.

Figure 3:
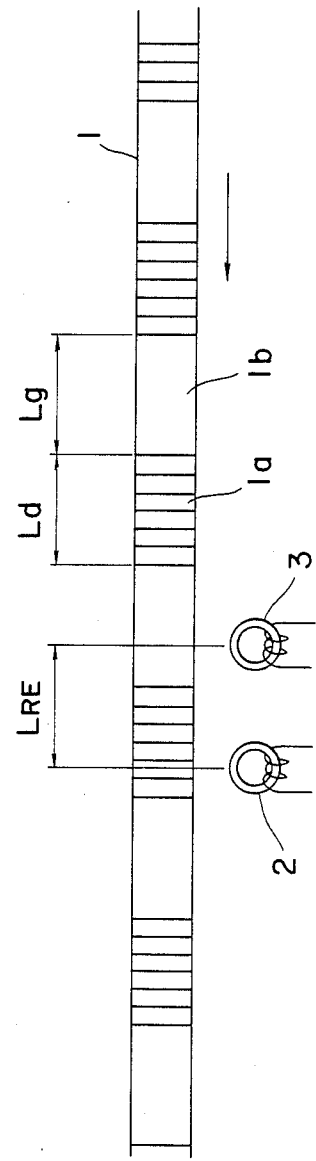
FIG. 3 is a schematic diagram showing a single data track with alternately-provided signal and no-signal regions featuring the first embodiment of the invention.

An alignment disk of an embodiment of the invention has a general configuration similar to that described with reference to FIG. 1. But the alignment disk has a feature as illustrated in FIG. 3 where the track is developed to be a straight line. Specifically, the signal regions in which signals are recorded 1a and no-signal regions 1a in which no signals are recorded are disposed alternately along each data track. The signal and the no-signal regions 1a and 1b are shown to have lengths Ld and Lg, respectively.

These lengths Ld and Lg are related to the distance $L_{RE}$ between an erase head 2 and a read/write head 3, as follows:

$$Ld < L_{RE} < Lg \quad (1)$$

Where the relationship of the expression (1) exists, the waveform interference due to magnetic coupling is eliminated. This is because the read/write head 3 is confronting a signal region 1a when the erase head 2 is confronting a no-signal region 1b, and the read/write head 3 is confronting a no-signal region 1b when the erase head 2 is confronting a signal region 1a.

Figure 4:
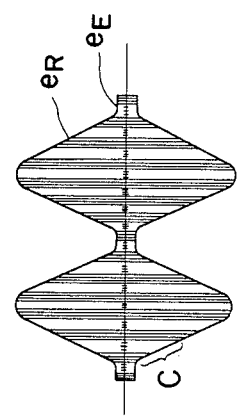
FIG. 4 is a waveform diagram showing a signal produced when the alignment disk with the feature of FIG. 3 is rotated.
Figure 5:
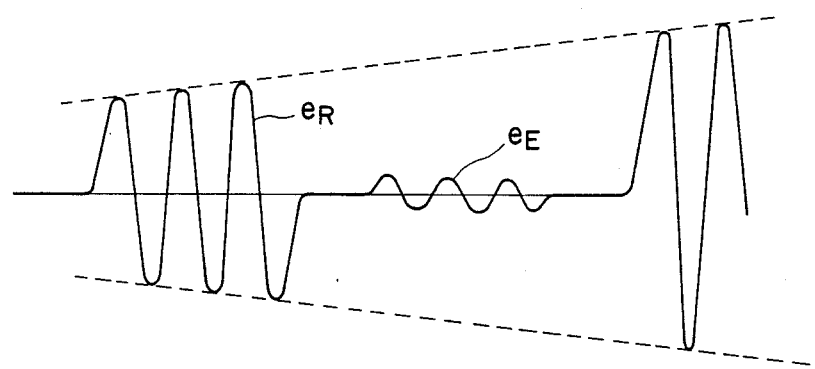
FIG. 5 is an enlarged view of the part C of FIG. 4.

This is explained in further detail. FIG. 4 shows a waveform obtained from an alignment disk of an embodiment of the invention. FIG. 5 is an enlarged partial view of part C of FIG. 4. The signal $e_R$ produced when the read/write head 3 is confronting a signal region 1a is larger than the signal $e_E$ produced when the read/write head 3 is confronting a no-signal region 1b and the erase head 2 is confronting a signal region 1a. The signal $e_R$ is composed of the signal as picked up by the read/write head and does not include any component due to the magnetic coupling because the erase head is not picking up any signal when $e_R$ is produced. The signal $e_E$ is composed of the signal detected by the erase head 2 and transferred, due to magnetic coupling, to the read/write head 3. The magnitude of the signal $e_E$ is substantially smaller than the magnitude of the signal $e_R$. For instance, the magnitude of $e_E$ is about 10 to 15% of the magnitude of $e_R$. Because the signals $e_E$ are smaller than the signals $e_R$, observation of the peaks $e_A$ and $e_B$ are not obstructed to by the presence of the signals $e_E$. Moreover, because the erase head 2 is not confronting any signal region when the read/write head is confronting a signal region, the signal $e_R$ is composed of the signal as picked up by the read/write head, and the magnitude of the envelope of the signals $e_R$ is an accurate indication of the position of the head relative to the data tracks. By measuring the peak values $e_A$ and $e_B$, or by determining the ratio between $e_A$ and $e_B$, the error in the positioning of the head is accurately determined. Such an error may be used for correction or adjustment of the position.

When the waveform of the signals as shown in FIG. 2 is observed on an oscilloscope, the signal $e_E$ appear inside of an envelope of $e_R$, so that $e_E$ is not conspicuous, and does not hinder the observation or measurement.

As was described, Ld should be smaller the $L_{RE}$, and Lg should be larger than $L_{RE}$ to avoid the error in the measurement. On the other hand, Lg should be small enough to produce an envelope which appears continuous on the screen of the oscilloscope.

The two data tracks are provided on the respective sides of the alignment disk. The head assembly on each side of the disk is positioned using the data tracks on the same side, so that the two head assemblies are positioned relative to each other, and ralative to the frame of the disk drive unit.

As has been described, according to the embodiment described, signal regions 1a and no-signal regions 1b are alternately provided and their lengths Ld and Lg are chosen to satisfy.

$$Ld < L_{RE} < Lg$$

As a result, no signal component due to the magnetic coupling is introduced into the signal produced when the read/write head is picking up the signal in the signal regions. As a result, the envelope of the signal produced from the read/write head is an accurate reflection of the position of the head relative to the data tracks. An accurate detection of the error in the head positioning and hence accurate adjustment of the head position can be made. These are achieved without resorting to a low frequency signal. Accordingly, reduction in the brightness on the oscilloscope (due to the use of the lower frequency) can be avoided. The efficiency of measurement and adjustment, particularly in a mass-production line, is improved.

Figure 7:
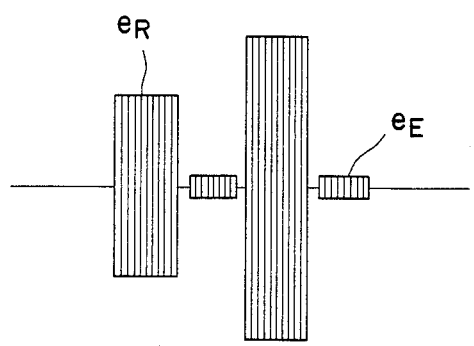
FIG. 7 is a waveform diagram showing a signal produced when an alignment disk of the second embodiment is rotated.
Figure 6A:
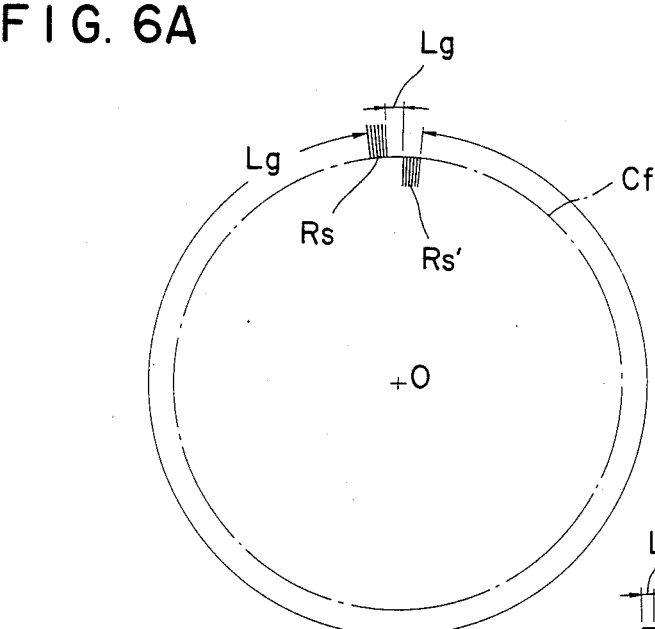
FIGS. 6A and 6B are schematic diagrams showing alignment disks of a burst type relating to a second embodiment of the invention, with FIG. 6C showing a detail of an alignment disk.
Figure 6C:
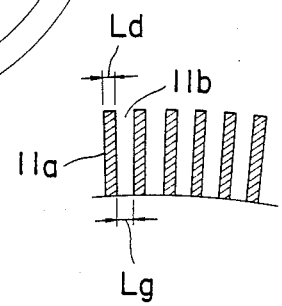
Figure 6B:
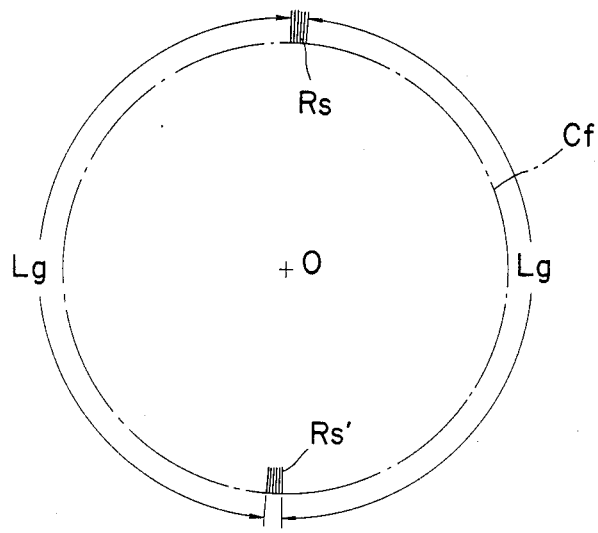

Now, the principle of measurement or error detection by an alignment disk of the burst type will be described with reference to FIGS. 6A and 6B, which show two difference examples of alignment disks. As illustrated, in each of the examples, two signal areas Rs, Rs' are provided one just outside and the other just inside of a circle Cf round an axis O of rotation. Each of the signal areas Rs, Rs' comprises, as shown in FIG. 6C, alternate signal regions 11a and intervening no-signal regions 11b. The magnetic head assembly should be positioned at the radius of the circle Cf. When accurately positioned, the read/write head will produce signals of the same magnitude when the first signal areas Rs and Rs' pass the read/write head. When the head is deviated from the radius of the circle Cf, the magnitudes of the signals will differ, as shown in FIG. 7. Using the ratio of the magnitudes of the signals, the error is detected and used for the adjustment or inspection.

When the invention is applied to an alignment disk of the burst type just described, the length Ld of each of the signal regions 11a is made smaller than $L_{RE}$, and the length Lg of each of the no-signal regions between the signal regions is made larger than $L_{RE}$. With such an arrangement, the error in the measurement due to the magnetic coupling between the read/write head and the erase head can be eliminated.

What is claimed is:

1. An alignment disk for use in adjustment or inspection of a magnetic read/write head in a floppy disk drive unit, which further includes an erase head, said alignment disk being provided with first regions in which signals are prerecorded and second regions in which no signals are prerecorded, the first and the second regions being alternately disposed along a locus followed by the read/write head when the disk is rotated, wherein the length of each of the first regions is smaller than the distance between read/write head and the erase head and the length of each of the second regions is larger than the distance between the read/write head and the erase head.

2. An alignment disk according to claim 1, wherein at least two data tracks are provided along said locus, each of the data tracks being eccentric with respect to said axis of rotation, so that said locus substantially coincide with a first one of the data tracks at a first angular position, said locus substantially coincide with second one of the data tracks at another angular position 180° apart from said first angular position, and said locus is between said first and said second ones of the two data tracks at angular positions 90° apart from said first angular position, and wherein the first regions and the second regions are provided alternately along each of the data tracks.

3. An alignment disk according to claim 2, wherein the length of each of the second regions is sufficiently small to produce an envelope which appears continuous.

4. An alignment disk according to claim 1, wherein the first regions comprise a first set of the first regions disposed outside of said locus and second set of the first regions disposed inside of said locus.

5. An alignment disk according to claim 1, wherein AC signals of a fixed frequency is written in the first regions.

* * * * *